(12) United States Patent
Hendrickson et al.

(10) Patent No.: US 7,596,296 B2
(45) Date of Patent: Sep. 29, 2009

(54) SYSTEM AND METHOD FOR DYNAMIC MEDIA REPRODUCTION

(76) Inventors: Gregory L. Hendrickson, c/o Microsoft Corporation, One Microsoft Way, Redmond, WA (US) 98052; David W. Baumert, c/o Microsoft Corporation, One Microsoft Way, Redmond, WA (US) 98052; James T. Reichert, c/o Microsoft Corporation, One Microsoft Way, Redmond, WA (US) 98052; Pamela J. Heath, c/o Microsoft Corporation, One Microsoft Way, Redmond, WA (US) 98052; Sven Pleyer, c/o Microsoft Corporation, One Microsoft Way, Redmond, WA (US) 98052

( * ) Notice: Subject to any disclaimer, the term of this patent is extended or adjusted under 35 U.S.C. 154(b) by 824 days.

(21) Appl. No.: 11/106,549

(22) Filed: Apr. 15, 2005

(65) Prior Publication Data

US 2006/0233055 A1    Oct. 19, 2006

(51) Int. Cl.
  *G11B 27/00* (2006.01)
  *H04N 5/93* (2006.01)
(52) U.S. Cl. ........................................ 386/52
(58) Field of Classification Search ................. 386/126; 369/1
  See application file for complete search history.

(56) References Cited

U.S. PATENT DOCUMENTS

2005/0077843 A1* 4/2005 Benditt ....................... 315/312
2005/0231642 A1* 10/2005 Roman et al. ............... 348/578
2006/0229752 A1* 10/2006 Chung ......................... 700/94

* cited by examiner

*Primary Examiner*—Thai Tran
*Assistant Examiner*—Girumsew Wendmagegn
(74) *Attorney, Agent, or Firm*—Shook, Hardy & Bacon L.L.P.

(57) ABSTRACT

A system and related techniques integrate the accessing, retrieving and playback of enhanced music or other digital media or content, including to permit advanced authoring, mixing and environmental inputs and effects. According to embodiments of the invention in one regard, a user may access a playback engine to retrieve and dynamically mix, manage and integrate music content with environmental sensors and effects such as detection people or numbers or people, lighting effects and other sensory experience. Thus the tempo of a mixed music track may vary with the number or persons in a room or the time of day or night, or lighting effects may brighten or dim based on dynamic contrasts in the music or other content. According to further embodiments, the playback engine may permit a user to link or navigate to other community resources such as a Web site detailing an artist, album, movie or soundtrack, or a bulletin board for consumers with an interest in artists, actors or others. Because the music authorizing format and reproduction system may compatibly operate on musical and other content containing defined media extensions and permit the content to be freely mixed and integrated with environmental inputs and effects, the richness and participation of the musical and other playback experience for the user may be enhanced.

20 Claims, 7 Drawing Sheets

SYSTEM AND METHOD FOR DYNAMIC MEDIA REPRODUCTION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of digital media, and more particularly to a system and method for accessing, processing and playing music or other content on a dynamic or composable basis, including an interface to discover and integrate networked resources such as lighting, environmental controls, information displays, sensors, or other devices that might contribute to the media experience.

BACKGROUND OF THE INVENTION

The advent of digitally encoded music has led to a variety of applications directed to music composition, storage and playback, including digital authoring or composing platforms and a variety of music and other media players. Some tools have been commercially developed which permit a musician or other artist to compose a multimedia work, such as a music album which includes video clips to accompany the music tracks. Other tools have been developed which permit a user to mix audio sources to create and store new musical material, or remixed or recombined versions of existing material.

However, while the amount and type of media content has continued to grow richer, the corresponding tools used to compose or consume that media have not necessarily kept pace. Playback applications generally assume a passive role for the listener or other consumer of the content, when that individual might actually wish to improvise, compose, mix or adapt the original content for their own purposes to enhance their media experience. Thus for example a music consumer might wish to generate a digitally encoded playlist of songs whose musical content may be dynamically responsive to environmental inputs, for example a set of songs whose tempo may increase as the number of people at a party or other function increases.

Music consumers and others may likewise desire to synchronize lighting and other environmental effects with the musical or other content being played. In addition, a composer or user of enhanced media products may wish to easily view or link to other media stores or information, for instance to navigate to a Web site storing biographical information on a musician or other artist. Other media and environmental integration may be desirable, with dynamic feedback between that music or other media and the environment in which it is played or delivered. Other problems and shortcomings in media composition and playback exist.

SUMMARY OF THE INVENTION

The invention overcoming these and other problems in the art relates in one regard to a system and method for dynamic media reproduction, in which a media playback engine on a personal computer or other client or machine may access, process and play enhanced media content such as music, audio or other source material. According to embodiments of the invention in one regard, the enhanced media content may contain interfaces to discover, synchronize and integrate environmental inputs and effects such as room sensing to detect the presence or number or people, lighting systems which may dynamically change according to the music or media being played, or other location-aware sensing or effects. According to embodiments of the invention in another regard, the musical or other content may be freely mixable, composable or recomposable using audio faders, mixers and other tools and effects. According to embodiments of the invention in a further regard, the music or other media which the user may access and play via the playback engine may automatically present selectable links or other connections to further artistic community resources, such as Web sites containing artist biographical data, musical sheet music, bulletin board resources for an artist's fans, or other community interests. According to embodiments in another aspect, the set of enhanced media resources and dynamic content and environmental options may be presented via a floating or rotatable cube or other media selection object, or other user interface or portal.

DETAILED DESCRIPTION OF EMBODIMENTS

Figure 1:
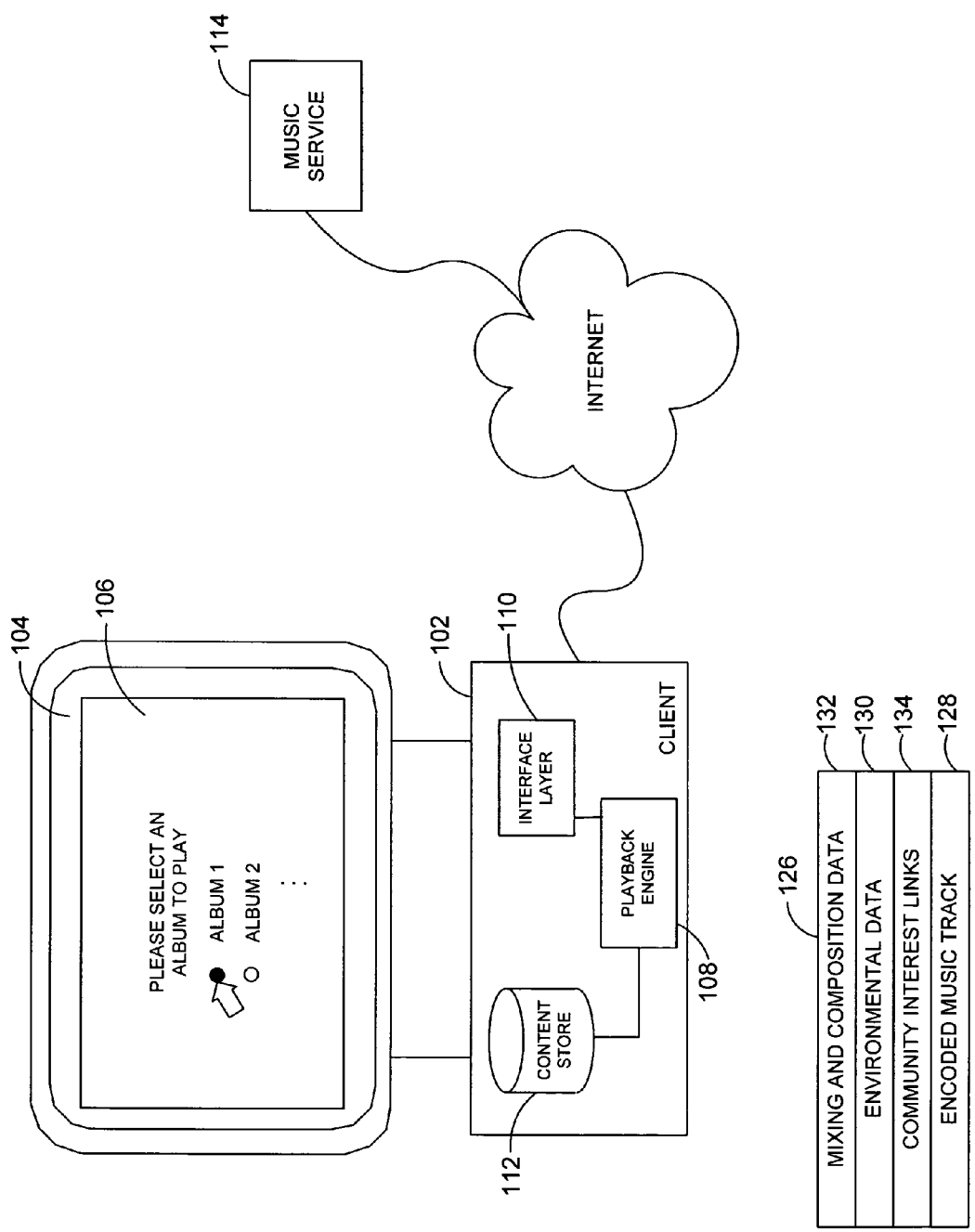
FIG. 1 illustrates an overall architecture in which a system and method for dynamic media reproduction may operate, according to embodiments of the invention.

FIG. 1 illustrates an environment in which a system and method for dynamic media reproduction may operate, according to an embodiment of the invention. As illustrated in that figure, according to embodiments a user may operate a client 102 such as a personal computer, portable digital assistant (PDA), network-enabled cellular telephone, portable digital audio or video player, or other client, machine or device to access, play and manipulate media content such as music files, video file, graphical or image content, or other media or content. That media or content may in embodiments as illustrated be stored in enhanced encoded media 126, such as one or more audio, video, animation or other files, content or other objects.

According to embodiments of the invention in one regard, the user may manipulate a user interface 104 such as a graphical user interface, command line interface, voice-activated interface or other interface or dialogue to access or initiate a playback application 106, such as an audio or music player, video player or other application, tool or resource. According to embodiments of the invention in a further regard, the playback application 106 may contain, invoke or interface to a playback engine 108, which may contain codecs and other logic to decode the enhanced media content 126 and perform mixing, editing, environmental and other composition or dynamic playback tasks.

According to embodiments of the invention in a further regard, enhanced encoded media 126 may in some cases be downloaded or accessed from a remote music service 114, such as a subscription-based or per-download based music, video or other Web site or other source. The enhanced encoded media 126 may as illustrated include media content 128 such as digitally encoded music or audio, such as audio or music files encoded in MP3 (motion pictures experts group Layer 3, or MPEG Layer 3), WMA (Windows™ Media Audio), Real™ Audio or other formats, video files encoded in digital video (DV) or other formats, animation files or objects such as those encoded in Audio-Visual Interleaved (AVI) format, images such as objects or files encoded in joint photographic experts group (JPG) format, addresses or other files, objects, content or media. Enhanced encoded media may likewise contain a data field, object or structure for environmental data 130 including, for instance, environment inputs and effects which may be associated with the media content 128.

The environmental data 130 may be or include, for example, input fields for data collected from environmental sensors such as temperature sensors for a room, photoelectric or other sensors detecting the entry or presence of persons in a room, a sensor to detect ambient lighting conditions, a wireless detection point for mobile devices such as cellular telephones, Bluetooth-equipped devices, radio frequency ID (RFID) or other environmental inputs, data or parameters. Likewise, the environmental data 130 may include outputs, interfaces or ports to environmental effects or controls such as lighting, for instance to alter color, brightness, turn off or on a light source, spin or otherwise manipulate a light source. Environmental effects or controlled parameters may likewise include room temperature, smoke or dry ice type effects, water temperatures in pools, saunas, baths or other recreational areas, interfaces to other media such as televisions, DVD video or other players, or other environmental, sensory or ambient variables or conditions in a room or rooms of interest. Other components, interfaces, objects or fields in environmental data 130 are possible.

Enhanced encoded media 128 may likewise contain other data fields or components including, as illustrated, mixing and composition data 132, which data may be or include musical scoring, synchronization, tempo, MIDI (musical instrument digital interface), MP3-encoded audio or musical content, volume control, sound effects (such as reverb, echo, fading, flanging or other effects) or other data or information. The enhanced encoded media 128 may furthermore contain a set of community interest links 134, which links may be or include Web site URLs (universal resource locators) or other links or addresses which may, for instance, be associated with the media content 128 so that a user may for example click, activate or navigate to a Web site or other source which may contain biographical, fan site, tour schedule or other information about an artist, artists, bands, performers or others who may have created, composed, produced, contributed to or otherwise been associated with the media content 128 or other aspects of the media reproduction experience. In embodiments the community interest links 134 may likewise contain or provide further downloadable media material, or other content or information.

Figure 2:
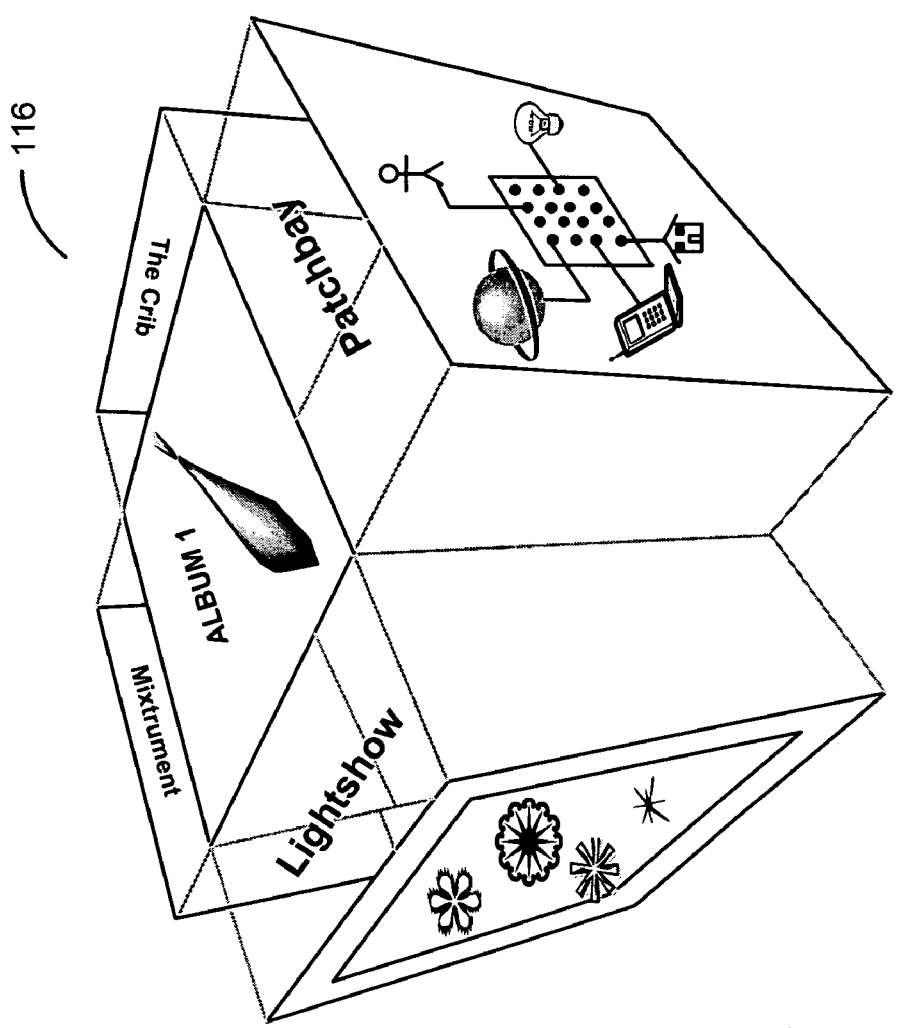
FIG. 2 illustrates an aspect of a media selection interface for controlling media reproduction, according to embodiments of the invention.

According to embodiments of the invention in one regard, and as for example illustrated in FIG. 2, when playback application 106 and/or playback engine 108 are invoked to dynamically or selectively access, mix and reproduce music and other media, those resources may initiate, generate or present a composition interface 116 to present selection, composition, environmental and other options to the user. In embodiments of the invention as shown, the composition interface 116 may be or include a three-dimensional object or interface which is freely rotatable or manipulable by the user, for instance using user interface 104, to select options, sources and actions to mix, control and present musical, video, graphical, animation or other content or media.

In embodiments, composition interface 116 may be or include other types of interfaces or interface elements, such as two-dimensional interfaces, dialogues, query boxes, radio buttons or other selectors, voice-activated or voice-recognition logic, or other interfaces or inputs. According to embodiments as shown, a user may select one or more musical albums, tracks or other content, video segments, animation sequences, graphical images or other media to select, mix, manage and compose, and/or to generate interactive inputs or effects to accompany that media, on an intuitive or freely selectable basis to recreate media, sensory and environmental experiences according to their choosing.

Figure 3:
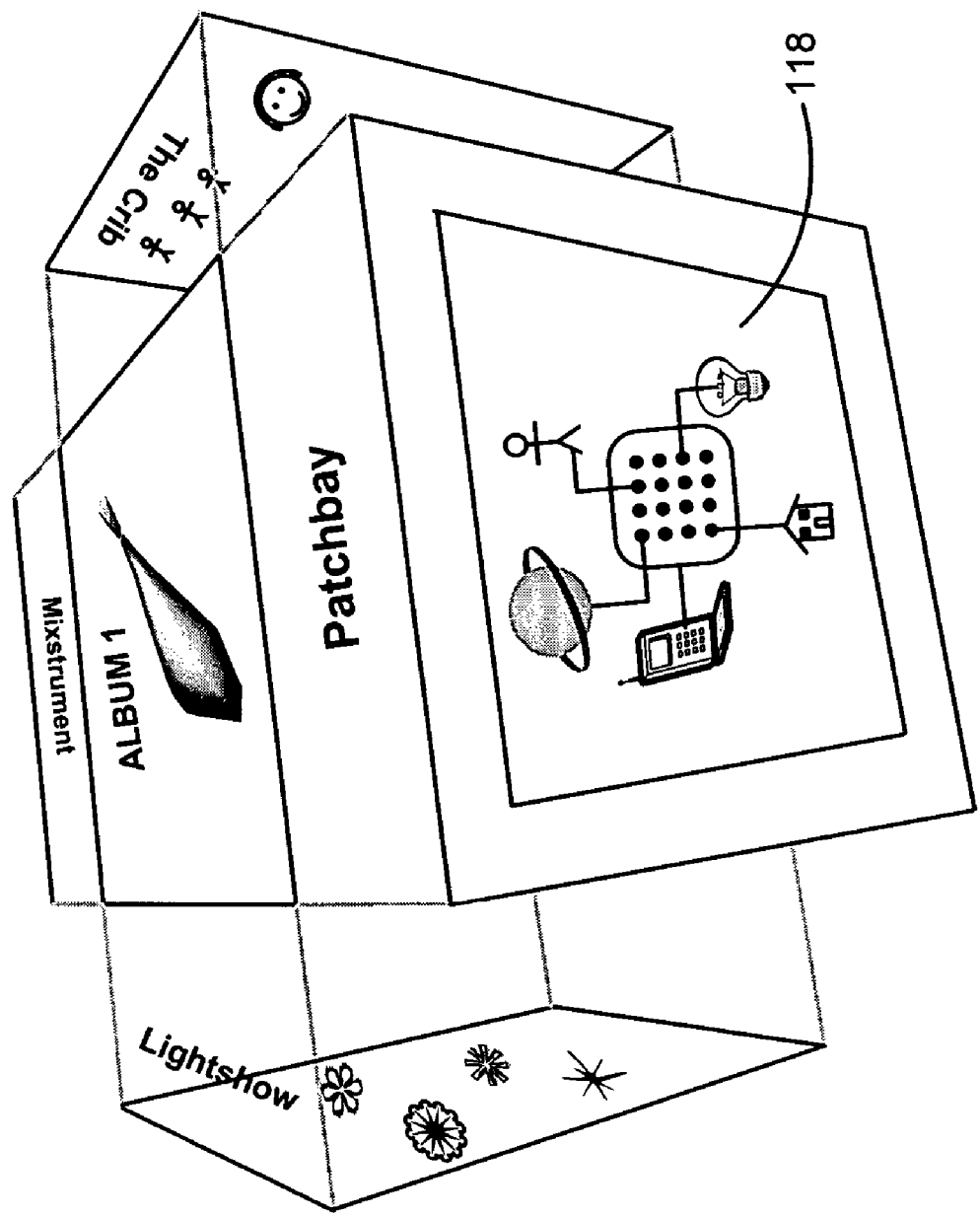
FIG. 3 illustrates an aspect of a media selection interface for controlling media reproduction, according to embodiments of the invention in another regard.

According to embodiments of the invention in one regard, and as for example illustrated in FIG. 3, the composition interface 116 may include, as a selectable 3-D cubic face or surface or otherwise, an environmental interface 118. Environmental interface 118 may serve as a patchbay or connection matrix for discovery of and connection to various environmental selections, inputs and effects which may be applied to or associated with the enhanced encoded media 128. Those inputs and effects may include, for example, a variety of networked devices including, for instance, sensors for the entry or presence of persons or persons into a room, such as by a photoelectric sensor or heat sensor, a temperature sensor to sense the temperature in a room, swimming pool, sauna or tub, a sound meter or other sound sensor, a lighting sensor to detect ambient lighting conditions, a smart fabric sensor such as may be embedded in furniture or clothing to detect the presence, motion or number of persons in an area or otherwise, an interface to cellular telephone service for keypad inputs, (GPS or other) location or other services, or other environmental, ambient or sensory detection.

The environmental interface 118 may likewise include selections or options to activate various environmental effects or outputs, such as lighting controls for intensity, color, pulsation, rotation or other lighting effects, temperature controls for room temperature, water temperature or other heating or cooling options, dry ice or other smoke effects, vibration effects such as a massage-type table, recliner or other furniture, the programming of effects to follow a person or persons from room to room or other location, or other environmental, ambient or sensory outputs or effects.

Figure 4:
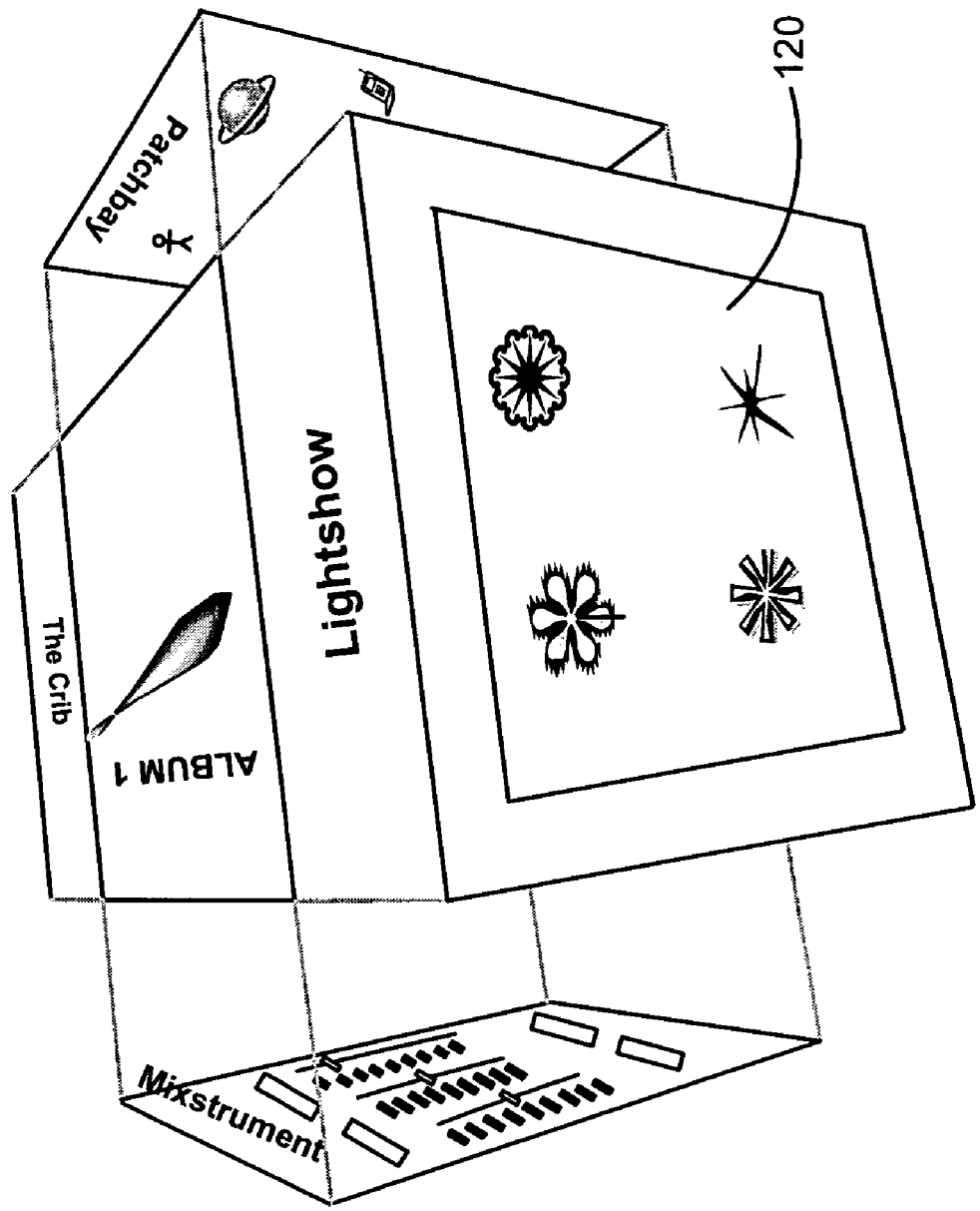
FIG. 4 illustrates an aspect of a media selection interface for controlling media reproduction, according to embodiments of the invention in another regard.
Figure 5:
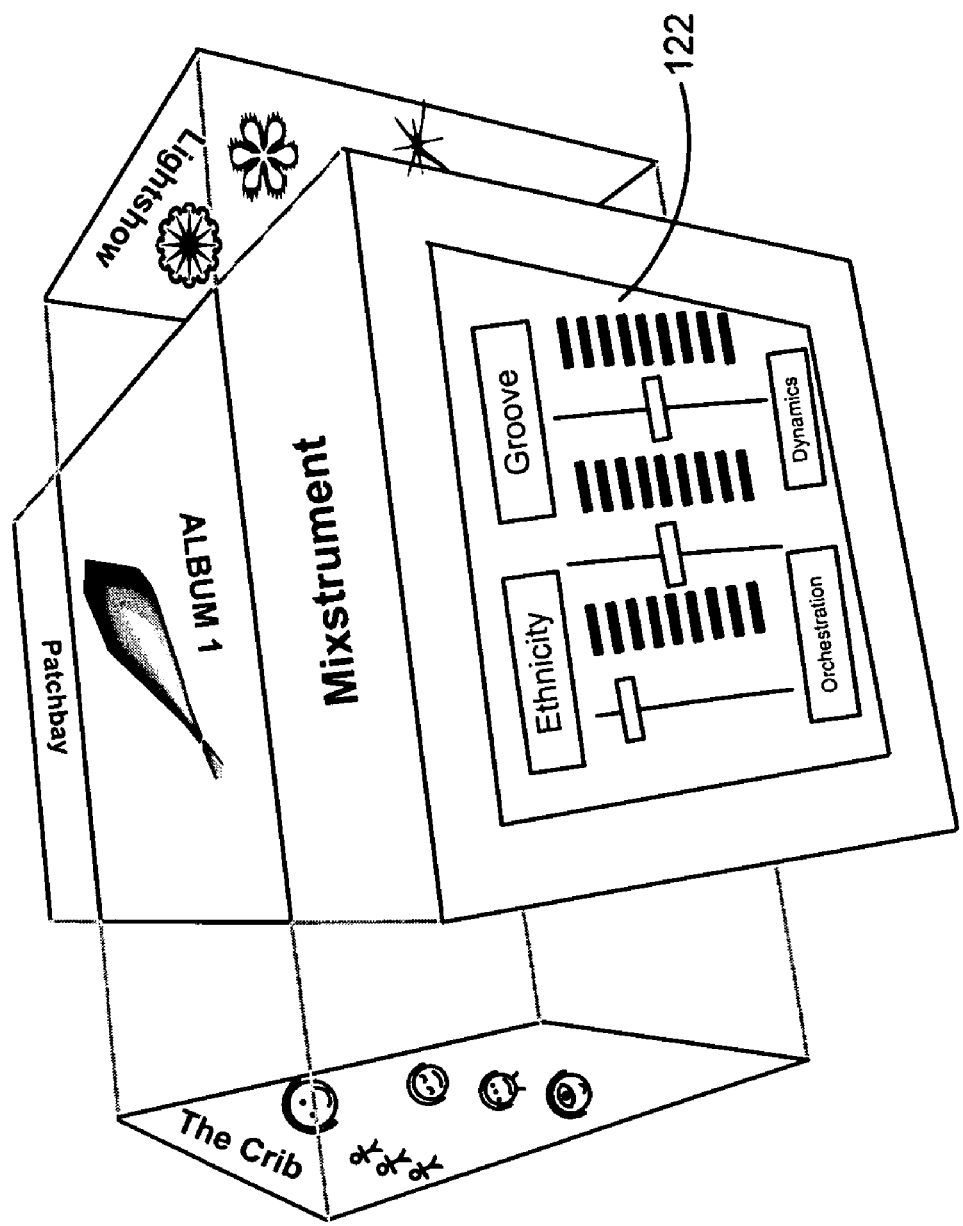
FIG. 5 illustrates an aspect of a media selection interface for controlling media reproduction, according to embodiments of the invention in another regard.

The composition interface 116 may likewise, and as for example illustrated in FIG. 4, include a 3-D or other lighting control interface 120, for example to control lighting effects such as turning lights or sequences of lights of or one, to adjust the intensity, color or timing of those lighting effects, to generate a sequence of effects across multiple light sources, to create discotheque-type lighting rotation or pulsing, or other lighting variables, controls or effects. Composition interface 116 may similarly, and as for example illustrated in FIG. 4, include a media mixing interface 122 such as an audio, video or other mixing console or other control facility. The media mixing interface 122 as shown may in embodiments include audio or musical mixing options or parameters, such as controls for beat or tempo, sound loudness or dynamics, orchestration or accompaniment, sound effects such as echo, flange, pitch control, dubbing, sampling or sample insertion or editing, noise removal or other filtering, or other effects, enhancements or alterations to the source media 128 or other content. According to embodiments of the invention in one regard, the media mixing interface 122 may provide the user with an opportunity to edit not merely individual sonic characteristics of music, or other media, but to transform the overall quality or impression conveyed by that music according to the user's taste or choice.

Thus, for example, higher-level or qualitative controls as illustrated may be applied to source content, for example an orchestration control to thin or reduce, or thicken or embellish, the overall number, type or overdubbing of instruments in a given song or track. Operating an ethnicity control may likewise change the instruments being voiced, for instance to change a banjo to a sitar, or perform other substitutions. Similarly, operating a groove control may alter a hiphop song or other content to present a Latin feel, while operating a dynamics control may not simply adjust volume higher or lower, but direct individual instruments to play with stronger accents, more legato or other effects. Other high-level controls are possible.

In embodiments of the invention in another regard, in terms of interface certain controls of the media mixing interface 122 may include sliders, faders or other controls or selectors. In further embodiments, the media mixing interface 122 may likewise include controls for other types of content, such as fading, blending, mixing, saturation and other controls for video samples, files or segments. Other types of media content, including for example animation sequences, sets of graphical images or other files or other content may likewise be accessed and composed using media mixing interface 122.

Figure 6:
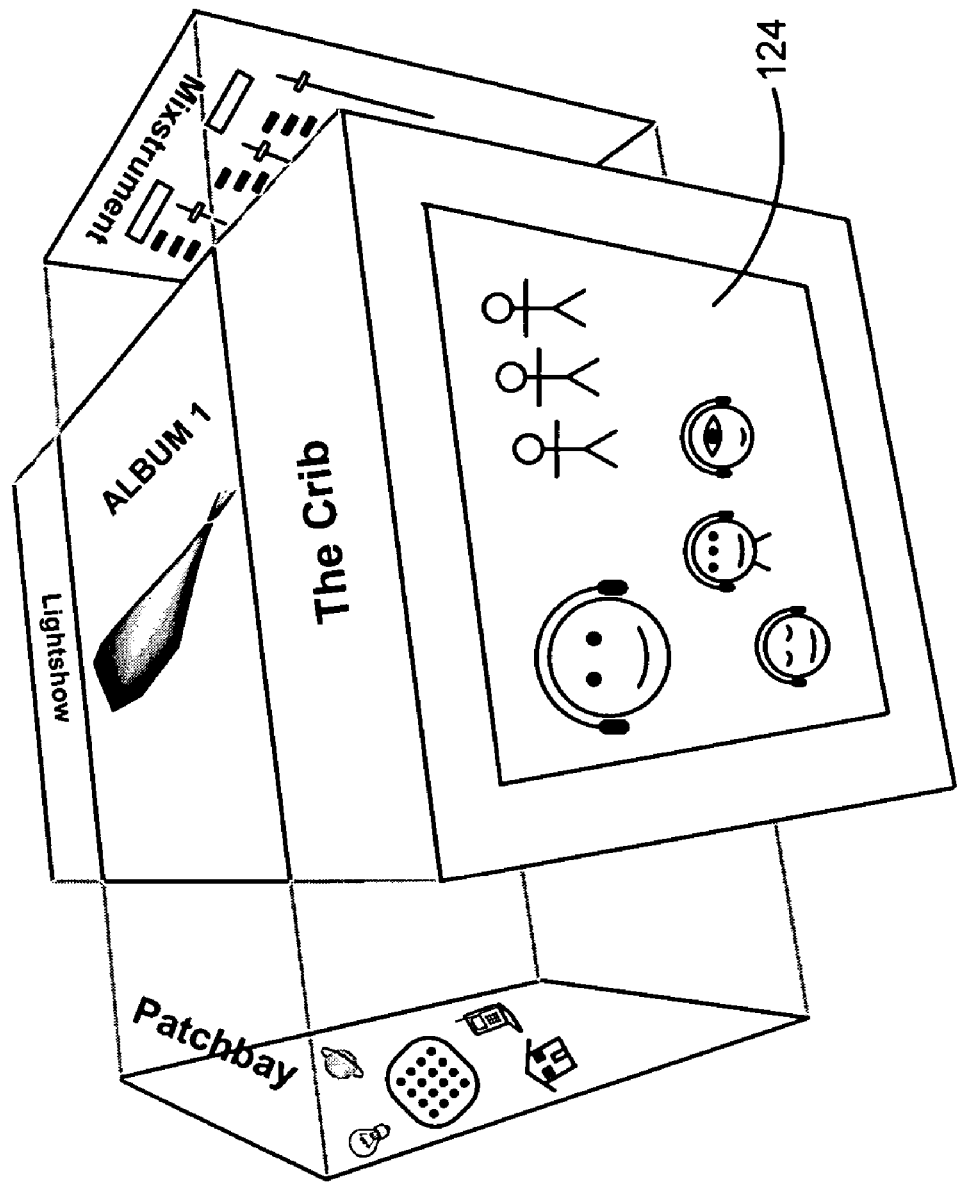
FIG. 6 illustrates an aspect of a media selection interface for controlling media reproduction, according to embodiments of the invention in another regard.

According to embodiments of the invention in a further regard, and as for example illustrated in FIG. 6, the composition interface 116 may likewise in embodiments include a community interest interface 124, which interface may include URL or other links to sites or information associated with enhanced encoded media 126, such as links to Web sites containing information, bulletin boards, fan sites, reviews or other data regarding an artist or artists, performers, bands, producers or other individuals related to or associated with the media content 128 or other aspects of the user's media experience. By associating community interest information with the playback of the source content itself, more fluent exchanges of artistic, mixing and other information may be facilitated. For example, in embodiments users may share or exchange remixed versions of samples, songs, video, or other composed or recomposed content, add reviews or provide or consume other information about the media content of interest to the community. Other applications are possible. In embodiments of the invention, other types, categories and interface styles for additional composition functions may be presented by composition interface 116, as well, which may in further embodiments be extensible or updateable, by download or otherwise.

Figure 7:
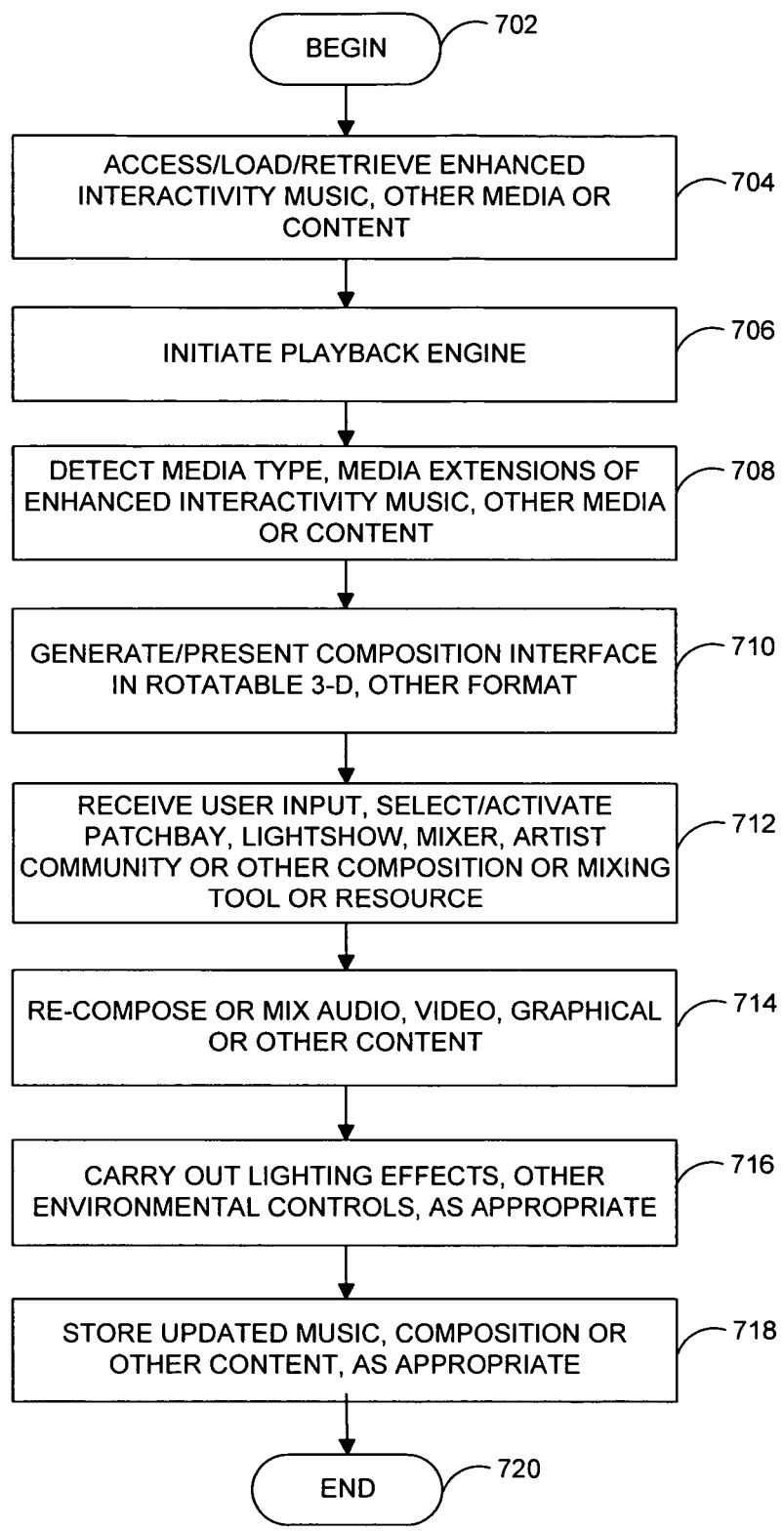
FIG. 7 illustrates a flowchart overall dynamic media reproduction, according to embodiments of the invention.

Overall dynamic media playback processing is illustrated in FIG. 7, according to embodiments of the invention. In step 702, processing may begin. In step 704, enhanced encoded media 126 such as one or more music file encoded in MP3, WMA (Windows™ Media Audio), Real™ Audio or other codecs or standards, or other audio or non-audio content having enhanced interactive compatibility may be accessed, loaded or retrieved, for example from a content store 112 in client 102, from removable media such as a CD-ROM or a removable flash memory or other memory device, from a remote music service 114, or otherwise. In step 706, playback engine 108 or other playback logic or resources may be loaded or initiated. In embodiments, the playback engine 108 may be embedded or incorporated in an operating system of client 102 or other device, or may be incorporated or hosted in an application or other resource or tool.

In step 708, the playback engine 108 or other logic may detect the media type or media extensions associated with enhanced encoded media 126, such as extensions indicating associated video files, graphic or image files, other audio tracks or files, or environmental inputs or effects such as room sensors or lighting equipment or settings. In step 710, the playback engine 108 may generate or present a composition interface 116, for instance via the user interface 104 of client 102, or otherwise. In embodiments, the composition interface 116 may be constructed and presented in a 3-D format as illustrated, or in other interface types such as 2-D, voice-activated, or other interfaces or dialogues.

In step 712, the playback engine 108 may receive user input via composition interface 116 or otherwise, such as user selection of music tracks, environmental inputs or effects, mixing instructions or other options or parameters, and activate corresponding patchbay, lightshow, mixing, artist or other interest community options or links. For example the playback engine 108 may receive an input to associate colored or dimmed lighting with a given musical track within enhanced encoded media 126, or to poll room sensors to receive a count of persons who have entered a room, such as by a photoelectric counter, and increase a tempo of all music tracks played as the number of persons who have been detected increases. Other inputs, effects and combinations of inputs, media and output are possible, which in general according to the invention afford the user, consumer or composer a more participatory aesthetic or sensory experience, including more control over media playback and accompaniments.

In step 714, the playback engine 108 may mix, compose, recompose or otherwise manipulate or adapt the enhanced encoded media 126, for instance to alter tempos or beats, include orchestration, echo, samples from other tracks, to record or register associated environmental inputs, cues, effects or outputs, to open or link to a community interest site such as an artist biographical site, to synchronize video samples or files with music tracks, or perform other mixing, editing or composing functions. In step 716, the playback engine 108 may transmit signals or otherwise carry out any selected environmental inputs or effects which have been associated with the enhanced encoded media 126, such as for example to increase, change or dim lighting, to sense or detect the number of persons in a room, to sense or alter temperature in a room, sauna, swimming pool or other location, to detect or interact with locally sensed cellular telephones or other devices, to or otherwise interact with, receive inputs from or transmit instructions to a desired environment. That environment may for example be manipulated using environmental interface 118 or other interface or control, and may for example transmit control signals to room equipment or other devices using the X-10 or other protocol or platform.

In step 718, the updated music, video, graphical, or other content reflected in the enhanced encoded media 126 may be stored, for example to content store 112, to remote music service 114, to removable media, or otherwise. In step 720, processing may return to a prior processing point, jump to a further processing point, repeat or end.

The foregoing description of the invention is illustrative, and modifications in configuration and implementation will occur to persons skilled in the art. For instance, while the invention has in embodiments been described in general as accessing, mixing, composing and manipulating music or audio files, in embodiments the playback engine 108 and other logic may control and dynamically compose other content, such as video, graphical, image or other content or media. Similarly, while the invention has generally been described in terms of a configuration in which one user may operate a client to access and dynamically play media from a local content store 112, in embodiments music, video, image or other content may be accessed and manipulated from or stored to a remote content store or service. Likewise, the music files or other content in embodiments may be retrieved or accessed from multiple stores, memory or databases in distributed fashion. Moreover, while the invention has generally been described as operating on media content according to inputs from a single user, in embodiments more than one user may share access to enhanced encoded media 126 and/or supply selections or other inputs to the playback application 106 or other control logic or resources.

Other hardware, software or other resources described as singular may in embodiments be distributed, and similarly in embodiments resources described as distributed may be combined. The scope of the invention is accordingly intended to be limited only by the following claims.

We claim:

1. A method for dynamic media reproduction, the method comprising:
   receiving source media and at least one environmental input via an input interface;
   presenting at least a set of media mixing options and a set of environmental interaction options to a user via an interface layer; and
   dynamically generating a playlist based on the at least one environmental input.

2. A method according to claim 1, wherein the source media comprises at least one of audio media, video media, animation media and graphical image media.

3. A method according to claim 1, wherein the media mixing options comprise at least one of tempo editing options, orchestration options, sound dynamics options, sound looping options, sound effects options, patch options and video blend options.

4. A method according to claim 1, wherein the environmental options comprise at least one of environmental inputs and environmental effects.

5. A method according to claim 4, wherein the environmental inputs comprise at least human presence detection sensor inputs, audio level sensor inputs, lighting detection inputs, smart fabric inputs and temperature inputs, and wherein the environmental effects comprise at least lighting effects, temperature control effects, smoke effects and audio volume effects.

6. A method according to claim 1, wherein the interface layer further comprises an interface to community interest links associated with the source media.

7. A method according to claim 1, wherein the interface layer communicates with a playback engine, the playback engine being configured to selectively store the dynamically reproduced media.

8. A method for dynamic media reproduction, comprising:
   receiving source media and at least one environmental input, the source media comprising at least one audio media, the audio media having a tempo;
   presenting at least a set of media mixing options and a set of environmental interaction options to dynamically reproduce the source media and
   automatically determining based on at the least one environmental input to increase the tempo of the audio media.

9. A method according to claim 8, wherein the source media additionally comprises at least one of video media, animation media and graphical image media.

10. A method according to claim 8, wherein the media mixing options comprise at least one of tempo editing options, orchestration options, sound dynamics options, sound looping options, sound effects options, patch options and video blend options.

11. A method according to claim 8, wherein the environmental options comprise at least one of environmental inputs and environmental effects.

12. A method according to claim 11, wherein the environmental inputs comprise at least human presence detection sensor inputs, audio level sensor inputs, lighting detection inputs, smart fabric inputs and temperature inputs, and wherein the environmental effects comprise at least lighting effects, temperature control effects, smoke effects and audio volume effects.

13. A method according to claim 8, further comprising presenting a set of community interest links associated with the source media.

14. A method according to claim 8, further comprising communicating with a playback engine, the playback engine being configured to selectively store the dynamically reproduced media.

15. A method for dynamic media reproduction, the method comprising:
   receiving source media, the source media having at least two temporally varying attributes;
   presenting at least a set of media mixing options and a set of environmental interaction options to a user, the set of media mixing options having at least one media mixing option for each of the at least two temporally varying attributes, the environmental interaction options being associated with at least one variable environmental output;
   receiving input from the user, the received input being associated with one of the at least two temporally varying attributes and with the at least one variable environmental output;
   associating the one of the at least two temporally varying attributes with the at least one variable environmental output in response to the received input; and
   varying the environmental output based on the one of the at least two temporally varying attributes to dynamically reproduce the source media.

16. A method according to claim 15, wherein the source media comprises at least one of audio media, video media, animation media and graphical image media.

17. A method according to claim 15, wherein the media mixing options comprise at least one of tempo editing options, orchestration options, sound dynamics options, sound looping options, sound effects options, patch options and video blend options.

18. A method according to claim 15, wherein the environmental options comprise at least one of environmental inputs and environmental effects.

19. A method according to claim 18, wherein the environmental inputs comprise at least human presence detection sensor inputs, audio level sensor inputs, lighting detection inputs, smart fabric inputs and temperature inputs, and wherein the environmental effects comprise at least lighting effects, temperature control effects, smoke effects and audio volume effects.

20. A method according to claim 15, wherein the method further comprises presenting a set of community interest links associated with the source media.

* * * * *

UNITED STATES PATENT AND TRADEMARK OFFICE
CERTIFICATE OF CORRECTION

PATENT NO. : 7,596,296 B2
APPLICATION NO. : 11/106549
DATED : September 29, 2009
INVENTOR(S) : Hendrickson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Twenty-eighth Day of September, 2010

David J. Kappos
*Director of the United States Patent and Trademark Office*